United States Patent
Takeuchi et al.

(10) Patent No.: US 7,898,265 B2
(45) Date of Patent: Mar. 1, 2011

(54) MICROWAVE PAINT THICKNESS SENSOR

(75) Inventors: Jimmy S. Takeuchi, Mercer Island, WA (US); Milton Perque, Tampa, FL (US); Patrick Anderson, Sammamish, WA (US); Edward G. Sergoyan, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 318 days.

(21) Appl. No.: 11/999,061

(22) Filed: Dec. 4, 2007

(65) Prior Publication Data

US 2009/0140751 A1    Jun. 4, 2009

(51) Int. Cl.
G01R 27/04    (2006.01)

(52) U.S. Cl. ..................... 324/636; 324/635

(58) Field of Classification Search .............. 324/635, 324/636
See application file for complete search history.

(56) References Cited

U.S. PATENT DOCUMENTS

| | | | | |
|---|---|---|---|---|
| 4,276,462 A | * | 6/1981 | Risman | 219/748 |
| 4,746,884 A | * | 5/1988 | Murakami et al. | 333/234 |
| 4,767,496 A | * | 8/1988 | Hieber | 438/17 |
| 5,315,210 A | * | 5/1994 | Lien | 315/5.39 |
| 5,935,910 A | * | 8/1999 | Das | 505/210 |
| 6,184,694 B1 | | 2/2001 | Anderson et al. | 324/635 |
| 6,208,421 B1 | * | 3/2001 | Maris et al. | 356/432 |
| 6,297,648 B1 | | 10/2001 | Lunden | 324/635 |
| 6,989,675 B2 | * | 1/2006 | Kesil et al. | 324/636 |
| 7,135,869 B2 | | 11/2006 | Sergoyan et al. | 324/636 |
| 7,173,435 B1 | | 2/2007 | Fay et al. | 324/636 |
| 2003/0096197 A1 | * | 5/2003 | Lee et al. | 430/318 |
| 2007/0170930 A1 | * | 7/2007 | Bassali et al. | 324/642 |

OTHER PUBLICATIONS

Lee et al., "Use of a Dielectric-loaded Cylindrical Cavity in Measurements of the Microwave Surface Resistances of High-Tc Superconducting Thin Films", Jun. 1997, IEEE Transactions on Applied Superconductivity, vol. 7, No. 2, pp. 2013-2017.*

* cited by examiner

Primary Examiner—Jeff Natalini
Assistant Examiner—John Zhu
(74) Attorney, Agent, or Firm—Hayes Soloway P.C.

(57) ABSTRACT

A microwave paint thickness sensor includes a single cylindrical cavity, a microwave source, and a signal detector. The cylindrical cavity is open at one end, the open end having a choke joint for interfacing with a painted surface. The cylindrical cavity is designed so that the electronic field is normal to the painted surface. In a preferred embodiment, this is accomplished by providing an optimally designed TM011 mode cavity. In this configuration, the resonant frequency of the cavity is linearly related to the inverse of the paint thickness. In accordance with one aspect of the present invention, the resonant cavity is optimally sized to resonate at a frequency where the sensor footprint can be minimized. Thus with the use of the choke joint, the small sensor interface area of the present invention may easily be applied to a curved surface.

16 Claims, 8 Drawing Sheets
(2 of 8 Drawing Sheet(s) Filed in Color)

A-A Section

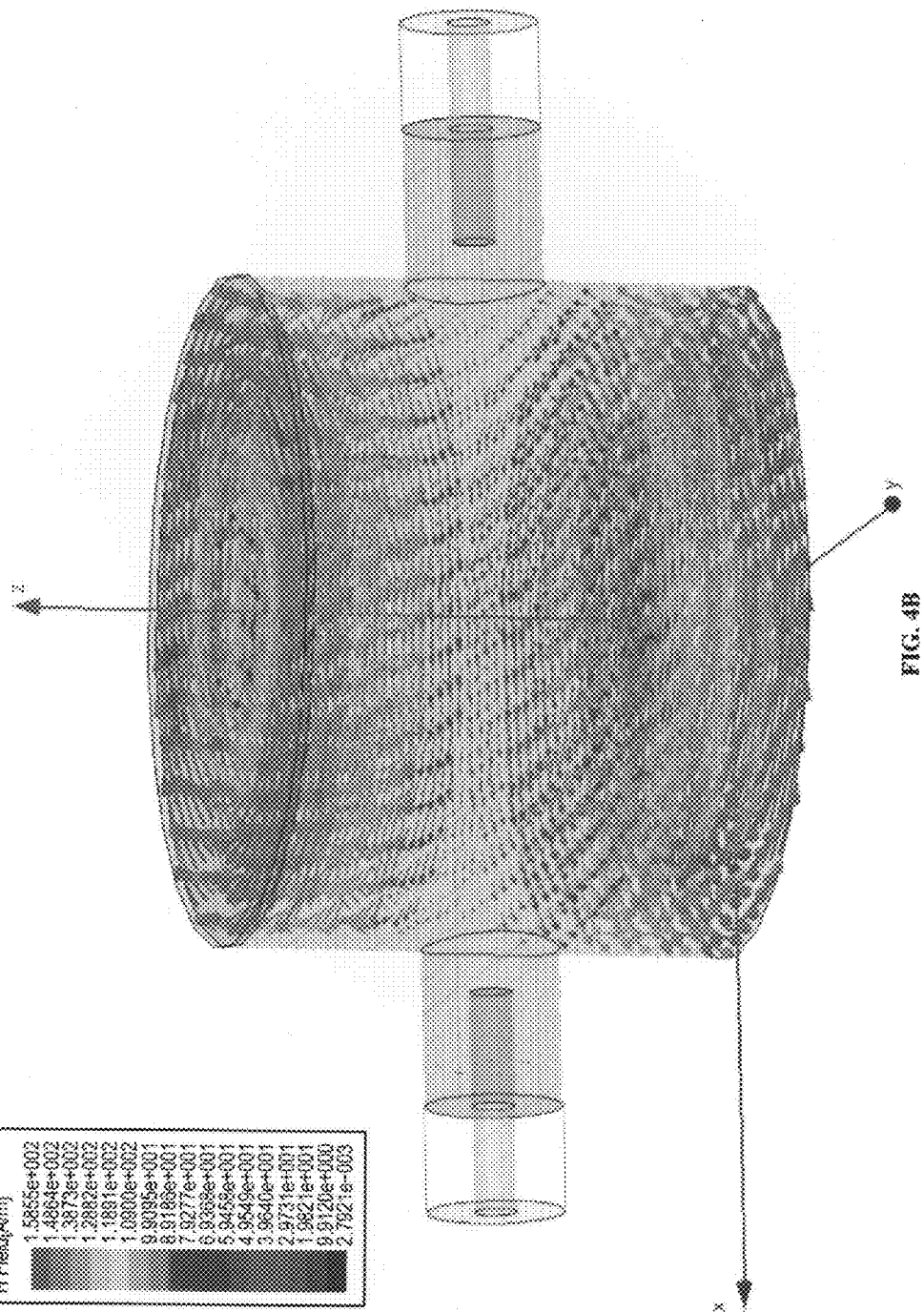

MICROWAVE PAINT THICKNESS SENSOR

FIELD

The present disclosure relates generally to the field of measurements. More particularly, the present disclosure relates to nondestructive measurement of the thickness of a film using electromagnetic cavity resonance principles correctly. The disclosure has particular utility in connection with measurement of paint thickness on a substrate and will be described in connection with such utility, although other utilities are contemplated.

BACKGROUND

Nondestructive measurement of a film thickness is an important objective for many industries. For example, in the aircraft industry, paint for functional and decorative purposes is often applied to aircraft surfaces, which may have near critical weight. Also, prior to applying a surface paint, care must be taken to ensure that an adequate amount of primer is uniformly applied with an adequate thickness to act as a proper corrosion inhibitor. For example, in some aircraft applications, a paint film thickness of 0.4 to 1.0 thousandth of an inch (mil) over the surface of the substrate is desirable. Moreover, depending on the model of aircraft, over 500 pounds of primer and topcoat may be applied to an aircraft in accordance with customer specifications.

Since the weight and distribution of paint on aircraft surfaces may sometimes affect the performance of the aircraft it is desirable to apply and measure the paint in a controlled means in order to generally apply a minimum adequate thickness. This measurement is desirable to ensure that the primer is sufficiently thick for corrosion protection, but not so thick as to unnecessarily add to the weight of the airplane, which can negatively affect fuel efficiency. After the primer thickness is determined to be of sufficient thickness, a top coat of paint can be applied. If the top coat is too thin, it is a cosmetic problem. If it is too thick, it will again add to the weight and affect performance.

For very thick coating of paint on a composite material there is an additional problem. Very thick coatings on a composite surface can provide an electrical path for lightning strike. The lightning will track along the thick paint rather than go directly through the paint to ground.

Aircraft components that are made of a metallic material can have their coatings measured by several conventional commercial tools. However, components are increasingly manufactured from carbon or glass fiber reinforced composite materials. These materials are difficult to measure using conventional techniques since they have relatively low direct-current conductivity and magnetic permeability.

Another conventional alternative is to wait for the paint to dry and indirectly measure the paint film thickness by weighing the component in question. This can result in an undesirable cycle delay of up to three days. For example, when primer needs to be measured on a composite component, the component may first be weighed, then painted and finally reweighed. In addition, this process can be prohibitively difficult in the case of large components, for example, an airplane fuselage. Since an acceptably accurate and dependable direct measurement technology for composite materials is not available, when the primer film is suspected of being excessively thick or uneven, the component typically must be disassembled and repainted at significant cost and risk of damage.

Commercial ultrasonic measurement systems, such as the Panametric 45L Deluxe® and/or the pulse echo linear transducer (PELT) produced by Defelsko, are available. These commercial products will give some paint measurement thickness data for some types of composites. The ultrasonic systems are useable for relatively thick coatings, but for thin coatings of paint the ultrasonic system is not sufficiently reliable and accurate to meet some specification requirements. Another concern is the additional training required needed to perform the ultrasonic thickness measurement as the method requires a practiced eye to discern the correct features of the returned signal to make a valid measurement.

Additionally, the nondestructive measurement of film thickness is of concern to other industries, such as the automotive industry and the paper production industry. In the automotive industry, the analysis of primer film thickness is important, for example, to determine whether additional touchup work is required for some of the paint applications common to the industry. In the paper industry, verifying the uniformity of the paper thickness can be an important quality control issue. With the increasing use of composite materials, it has become apparent that current methods of measurement that perform adequately with metallic substrates or with thick films, but not with substrate materials that have relatively low direct-current conductivity and magnetic permeability or with thin films, are not sufficient.

The foregoing discussion derives primarily from U.S. Pat. No. 7,173,435, which discloses a thickness measuring apparatus and method using a microwave cavity resonator. Referring to FIG. 1, which corresponds to FIG. 1 of U.S. Pat. No. 7,173,435, a measurement device generally comprises a resonant cavity 18, a radio frequency (RF) input 24, and a signal detector 34. The resonant cavity has a chamber 20 with an open flat end 22 which is placed over a sample 12 having a substrate 16 and a dielectric layer 14. The RF input is connected to the chamber using a connection 26 which may be, for example, a coaxial cable. The signal detector 34 is also connected via its own connection to the chamber by a connection 32, which may be, for example, a coaxial cable. In addition, a processor 36 is provided to correlate the output power of the resonant cavity to a thickness of the dielectric layer. With this device, thickness of the dielectric is determined by accurately calibrating to known thickness samples.

The essential element of this and any thickness measurement instrument is the sensor, in this case, the resonant RF cavity. Previous patents including the one mentioned above do not provide the design details of this essential element. It has been found that without the correct design of the resonant cavity, the sensor, the measurement instrument functions very poorly. This present disclosure establishes the basis for thickness measurement using a frequency in the microwave range and details the design of this essential element.

SUMMARY

The present disclosure provides a method and apparatus for measuring paint thickness that is capable of nondestructive measurement of a paint, film, or epoxy thickness over a metal or composite material or substrate. More particularly, the present disclosure generally comprises a cylindrical cavity, a microwave source, and a signal detector. The cylindrical cavity contains a chamber that is open at one end, the open end having a choke joint for interfacing with the target surface. The microwave source is oriented such that the electronic field is normal to the painted surface. In this configuration, the resonant frequency of the cavity is linearly related to the inverse of the paint thickness. This linearity allows a simple calibration of the sensor to different paints (i.e., different dielectric constants).

In one embodiment there is provided a measurement device for measuring a thickness of a film layer on a surface of a substrate comprising: a right cylindrical resonant cavity operating in a TM011 mode, having an open side at a flat end of the resonant cavity, for placement in contact with the substrate to be measured whereupon the substrate acts as a wall of the resonant cavity, wherein the high frequency electromagnetic wave signal produces an eletromagnetic field in the cavity that is substantially normal to the substrate. The device also includes a microwave source to generate a high frequency electromagnetic wave signal coupled to the resonant cavity, and a signal detector to sense an output power of the signal coupled to the resonant cavity.

In another embodiment there is provided a system for measuring a thickness of a material applied to a substrate, the system comprising a resonator including a cavity having an opening such that when the resonator is placed against the substrate to be measured, the cavity is closed, a choke groove disposed about the cavity, and an RF input and output disposed such that when an electromagnetic wave is transmitted through the input, the eletromagnetic wave enters the cavity and is able to pass through the output. The resonator is configured such that when the electromagnetic wave enters the cavity through the input an electromagnetic field is produced incident upon the substrate that is substantially normal to the substrate.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The file of this patent contains two (2) color drawing Figures, namely, FIGS. 4A and 4B The features, functions, and advantages that have been discussed can be achieved independently in various embodiments of the present invention or may be combined in yet other embodiments further details of which can be seen with reference to the following description and drawings, wherein like numerals depict like parts, and wherein:

FIG. 4B is an illustration of a simulated magnetic field (H-field) produced within a TM011 mode resonance cavity;

DETAILED DESCRIPTION

Figure 1:
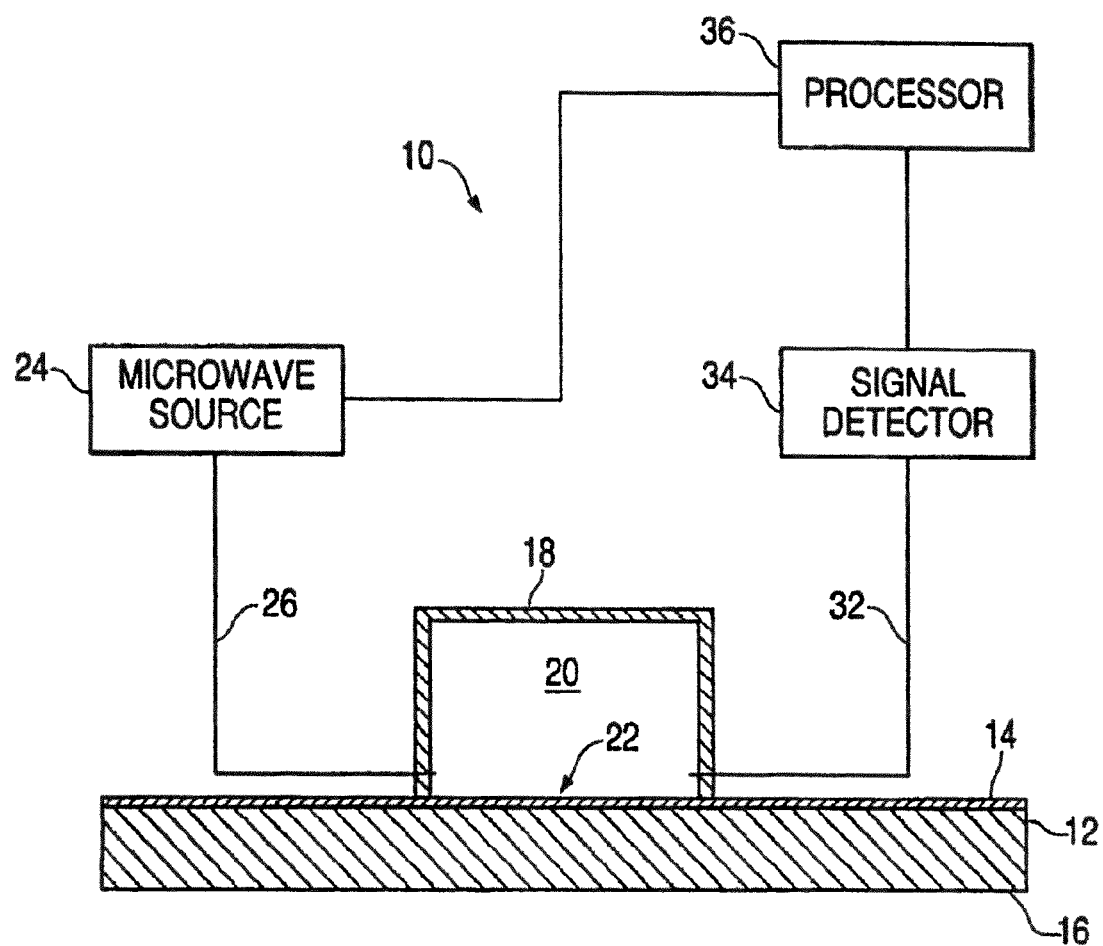
FIG. 1 is a schematic of a microwave paint thickness sensor in accordance with the prior art.
Figure 2A:
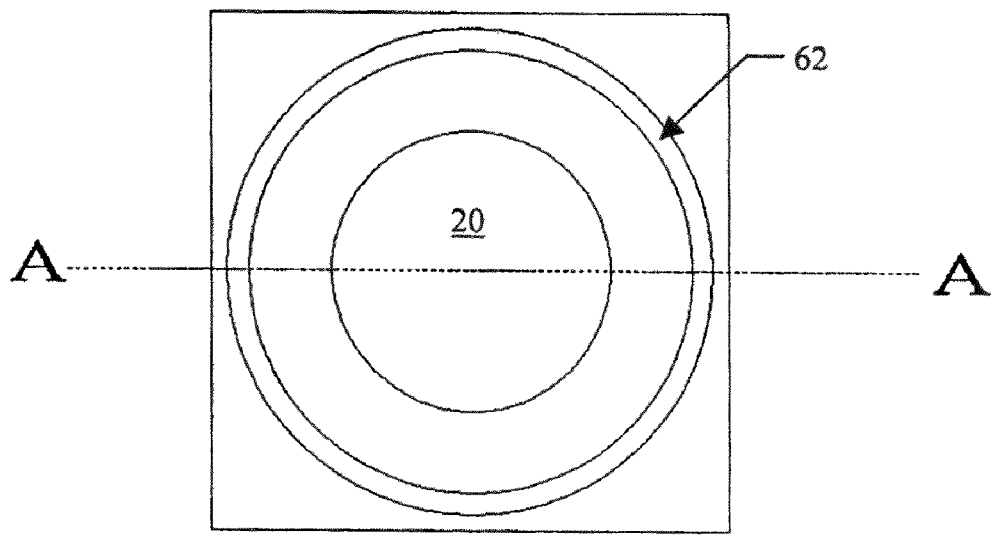
FIG. 2A is a top view of a resonance cavity in accordance with one embodiment of the present disclosure.
Figure 2B:
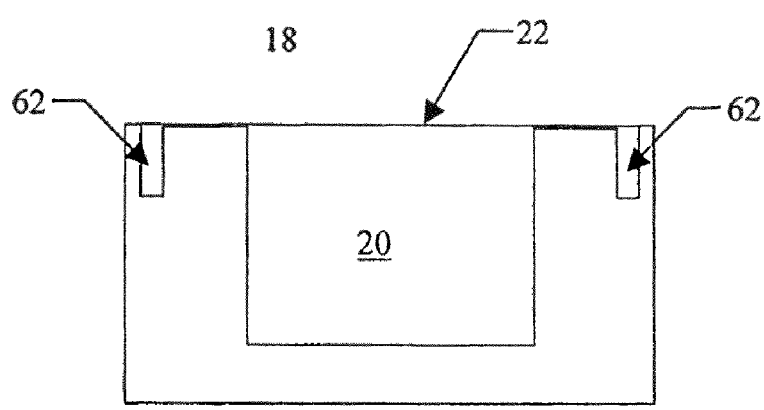
FIG. 2B is a sectioned view of the resonance cavity shown in FIG. 1A, viewed from section A-A.

An embodiment in accordance with the present disclosure provides a portable and accurate measurement device for measuring the thickness of a layer of dielectric material, such as paint or protective coatings, on a substrate of metallic or composite material. The present disclosed embodiment includes the elements of the prior art shown in FIG. 1, namely, a cylindrical resonant cavity 18 having a chamber 20 with an open flat end 22, an RF input 24 having a connection 26 to the resonant cavity, and a signal detector 34 having a connection 32 to the resonant cavity. The key improvement upon the prior art in the present disclosure is a sensor in the form of a microwave cavity resonator operating in the TM011 mode, and designed to resonate at a microwave frequency with the electric field (E-field) being normal to the dielectric layer. As will be described below, the microwave cavity resonator sensor of the present disclosure responds essentially linear to paint thickness. FIGS. 2A and 2B depict a resonant cavity 2 sensor 18 in accordance with the present invention, having a chamber 20 with an open end 22 surrounded by a choke joint 62.

While cavity resonators have been used in microwave technology before, the use of a resonator designed to operate at optimal E and H-field modes with the thickness sensing on one open wall and designed to integrate with the target is unique. The paint (or target) is sensed at the open flat end of the cavity. The chamber 20 is sized to have a baseline electromagnetic resonant frequency in the microwave range when the open side 22 is placed against the surface of a conductive material, which can act as a wall of the resonant cavity 18, to enclose the chamber 20. In operation, the resonant cavity 18 is placed in proximity to the measurement sample 12 with the open side 22 abutted against the measurement sample 12, as shown in FIG. 1, wherein the surface of the measurement sample 12 acts as a wall of the resonant cavity 18. Thus, the thickness of the film layer 14 can determine the effective distance to the surface of the substrate 16, the effective size of the chamber 20 and the resulting resonant frequency of the resonant cavity 18.

The output power of each discrete frequency signal will depend on the difference, or shift, between the baseline resonant frequency of the resonant cavity and the resulting resonant frequency with the measurement sample acting as one wall of the cavity. Thus, the thickness of the paint produces a shift in the resonant frequency.

In one embodiment, the cavity is ½ wavelength long and approximately ½ wavelength in diameter. In this regard, the cavity acts as a circular resonant waveguide. For example, in a particular embodiment, the resonant operating frequency is approximately 15 GHz. This corresponds to an internal diameter of 15 mm, providing a convenient size for the paint thickness measuring application. 15 GHz is in the Ku-band microwave frequency range (12-18 GHz) where there are standard parts and test equipment available to minimize the cost of sensor implementation.

In order to improve the effective electromagnetic RF contact between the resonant cavity and a measurement target, the measuring device also may include a choke joint, two precision-machined grooves encircling the open side of the resonant cavity.

The RF input preferably is a microwave source that can produce an electromagnetic wave signal in the super high frequency range, for example, between three and thirty gigahertz (GHz), which can be introduced into the resonant cavity at one end, or side. For one embodiment, the RF input is introduced through a side of the cavity through a coaxial connector. The RF input may also be introduced through the top, the cylindrical side, through a coaxial connector. The RF input can be a monolithic microwave integrated circuit (MMIC) voltage-controlled oscillator (VCO) with a variable output frequency, or a dielectric resonator oscillator (DRO) with a fixed output frequency, or a combination of these. The device can further include a frequency multiplier to increase the signal frequency by a predetermined factor. For example, a relatively low-frequency signal can be generated at a remote location from the resonant cavity and converted to a relatively high-frequency signal before being introduced into the resonant cavity.

The signal can be introduced into the resonant cavity 18 at one end, or side, of the chamber 20 by way of an electrical link 26, such as a cable. At the far end, or side, of the chamber 20, the signal can be conducted through an electrical link 32 to a signal detector 34 that can sense an output power of the signal. For example, the signal detector 34 can include a Schottky diode sensor that converts the microwave signal into a steady state, or direct current, voltage signal. That is, a Schottky diode sensor can produce a direct current voltage in response to the power, or magnitude, of the output microwave signal.

Figure 3A:
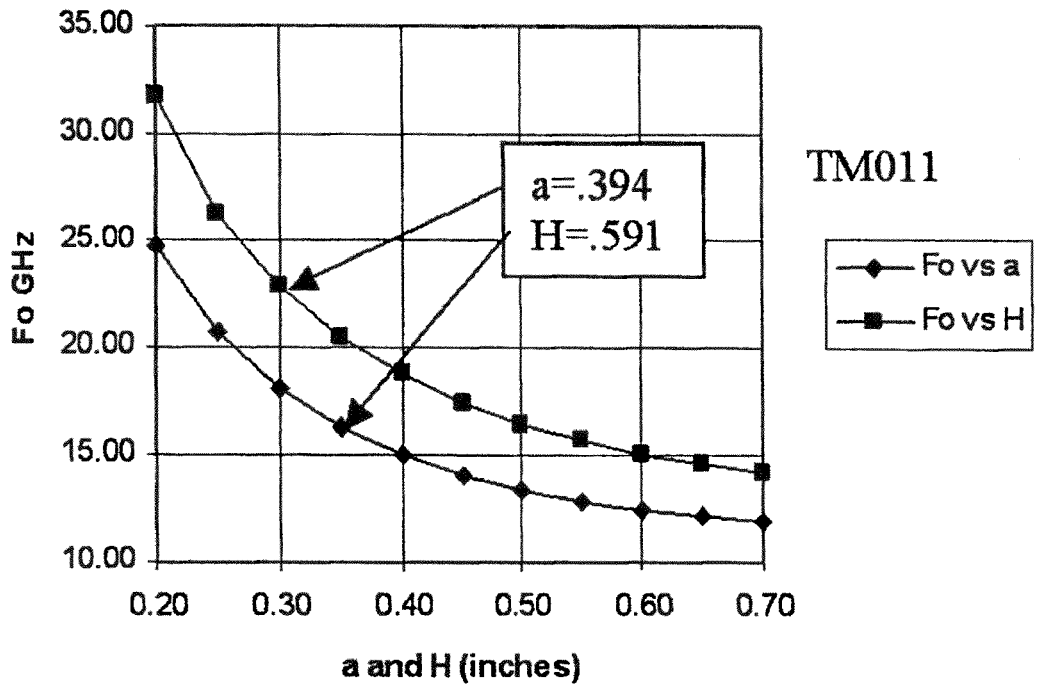
FIGS. 3A, 3B, and 3C are charts showing the size of resonant cavities for TM011, TE011, and TE111 modes, respectively.
Figure 3B:
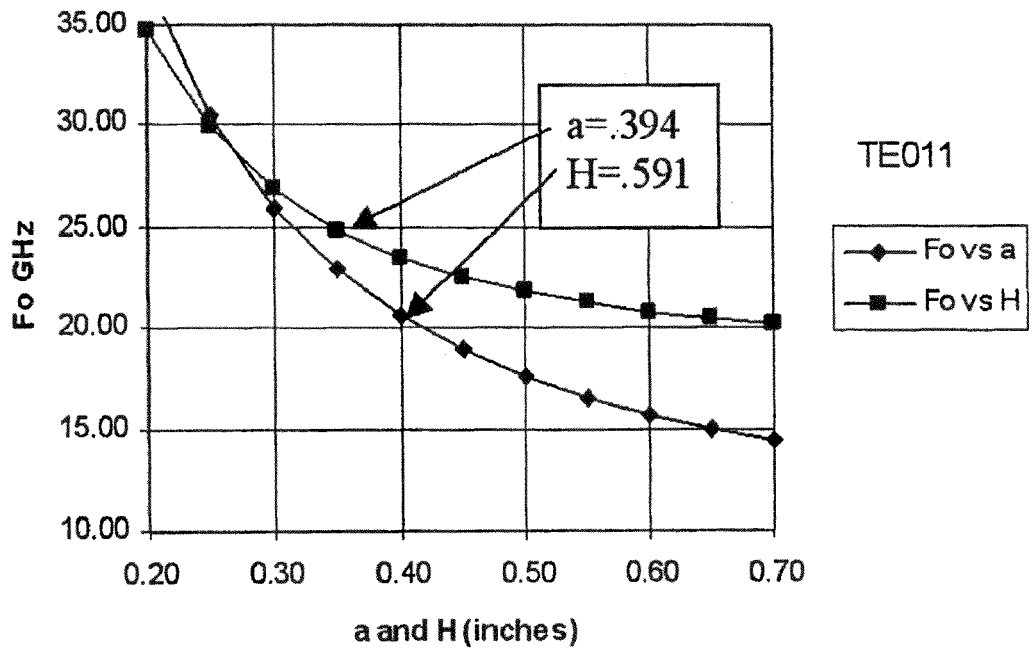
Figure 3C:
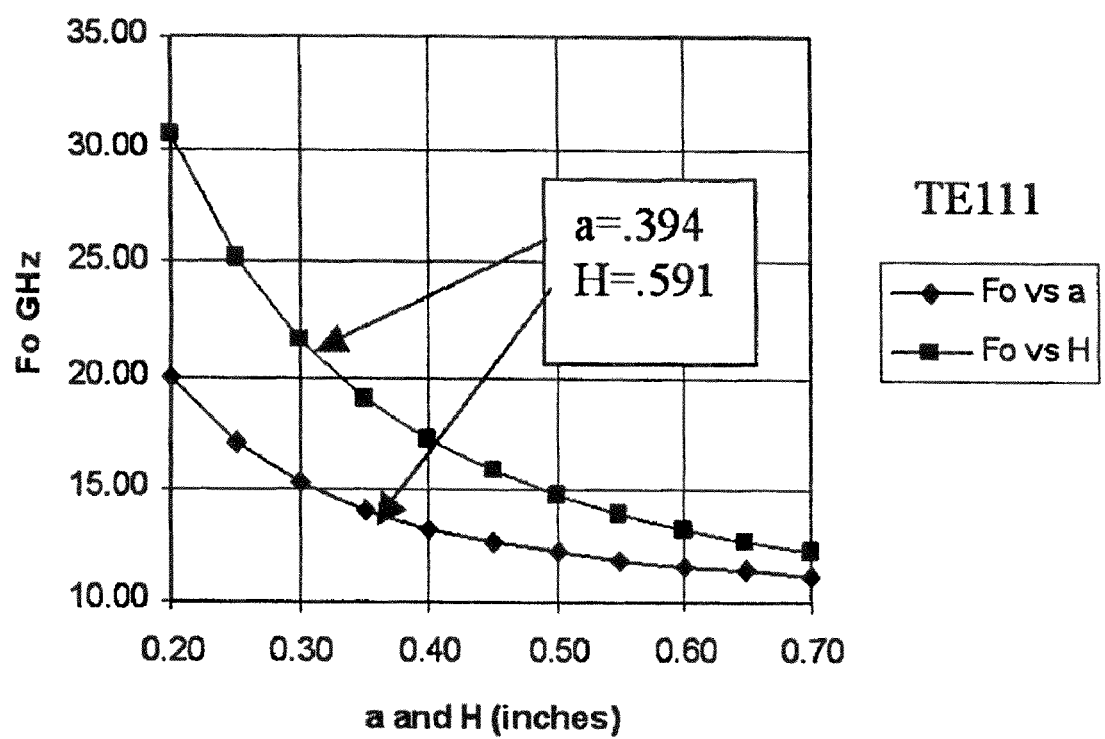
Figure 4A:
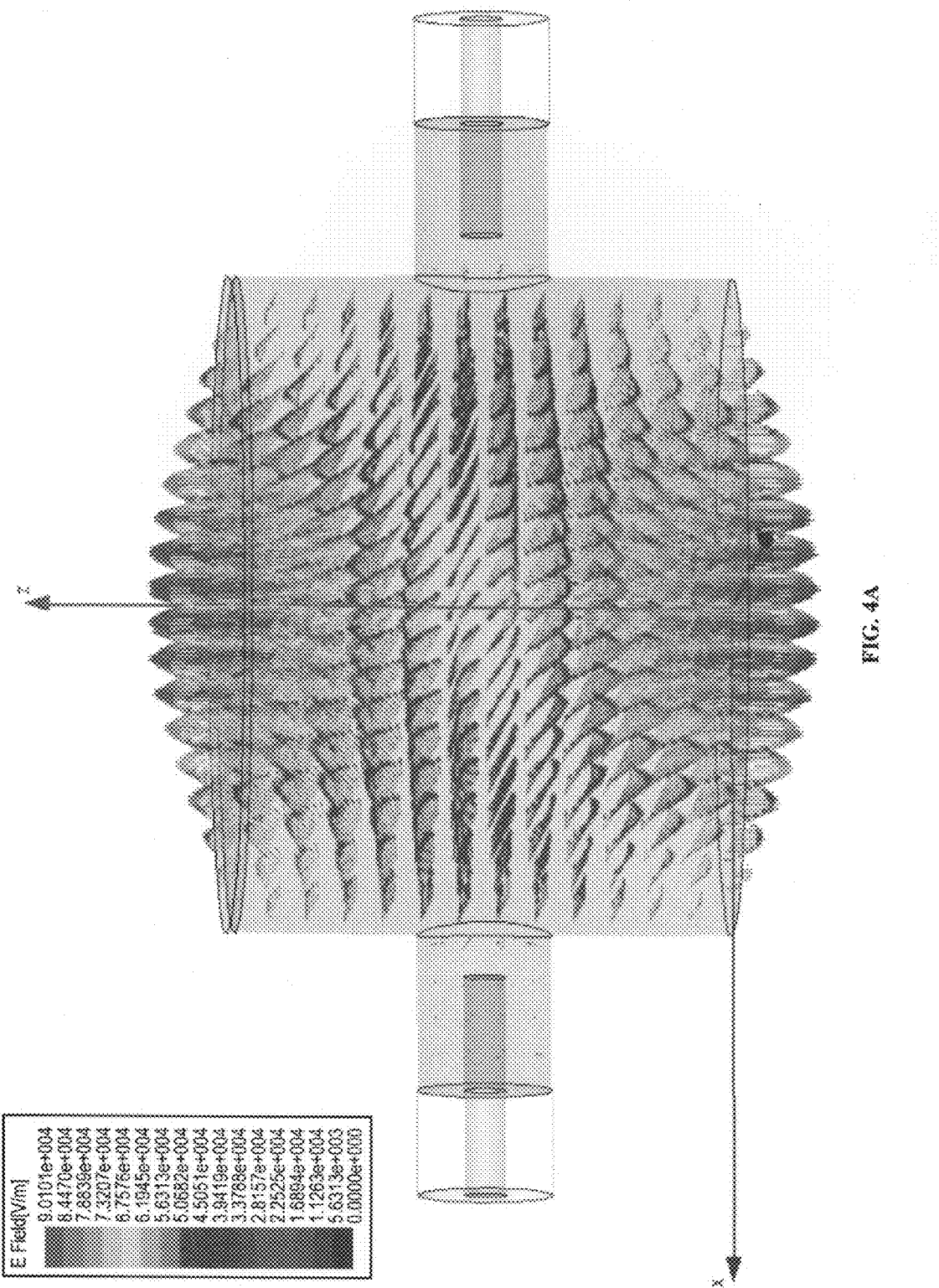
FIG. 4A is an illustration of a simulated electric field (E-field) produced within a TM011 mode resonance cavity.

Furthermore, the device can include a processor, such as a personal computer, to correlate the output power to the film thickness. The correlation can be based on, for example, either the output power at a fixed frequency or a frequency that produces a maximum output power within a frequency range. In one embodiment, the signal detector is connected to the resonant cavity by a coaxial connector. The maximum power of the output signal will occur at the input frequency that is closest to the resulting resonant frequency, f; of the cavity 20, and the output power will decrease as the absolute difference increases between the input frequency and the resulting resonant frequency. In order to determine the optimal resonant cavity, different cavity modes were tested. Three of the lowest order modes in a cylindrical cavity were evaluated; namely TM011, TE011, and TE111. FIGS. 3A, 3B, and 3C show a range of cavity sizes for the different modes. The TM011 mode provided the most optimal performance parameters of the three modes and was used for an experimental model. E-field and H-field intensity vectors for a resonant cavity in accordance with the present disclosure are shown in FIGS. 4A and 4B, respectively. These fields were derived from a finite element Electromagnetic simulator program called High Frequency System Simulation or HFSS by Ansoft, Inc.

The TM011 resonator has several features that are advantageous for this paint thickness sensor application. The TM011 mode produces a high quality factor (Q), wherein a single cavity can produce accurate measurements. It also allows a small sensor to be constructed, such that the measurement sensor may be placed on the desired target surface including moderately curved surfaces without a gap, and produce repeatable results. The E-field is directed normal to the paint surface which allows the device to work for surfaces which have substrates of metal or composite materials. Finally, because only one resonant cavity is required to produce an accurate measurement, the measurement device is mechanically simple and at 15 GHz, is physically small.

An important indicator of the sensitivity of the sensor is net Q. This is true whether sensing the center frequency shift of the resonator or the measurement frequency amplitude change on the rejection slope of the sensor's resonator. The minimum required Q is determined by the desired measurement thickness resolution. Preferably, the Q minimum should be the inverse of the fractional thickness resolution desired.

The Q requirement for 0.2 mil (dt) resolution with a total paint thickness of 30 mils (tmax) is expressed:

$$Q > 1/(dt/tmax) = 1/(0.2 \text{ mils}/30 \text{ misl}) = 150$$

A greater Q will reduce error in the measurement of the frequency shift. Alternatively, interpolating between multiple measurements can reduce error.

A TM011 mode cylindrical cavity coated with anodyne and filled with air will have a Q in excess of 10,000. Where the coaxial connectors are decoupled to minimize a loss of Q, the paint will be the dominant RF loss mechanism in the sensor's cavity with the expected paint loss tangent to be a nominal 0.02. With this loss tangent and a maximum paint thickness of 30 mils, the net Q will be lowered to approximately 2,000.

The theoretical discussion above has been confirmed by measurements using an experimental model. The key performance parameters needed to be a useful and highly sensitive paint thickness sensor has been demonstrated and is described in the following examples.

EXAMPLE 1

Figure 5A:
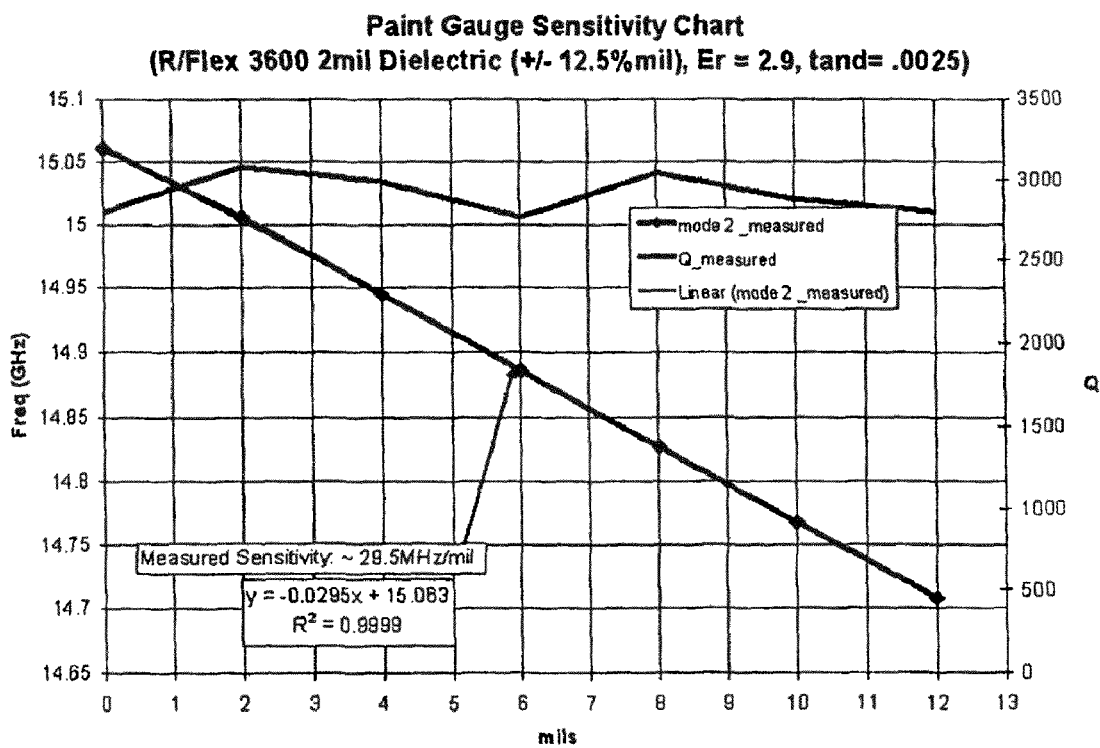
FIGS. 5A, 5B, and 5C are charts showing the sensitivity of a microwave paint thickness sensor in accordance with the present disclosure to different dielectric surfaces of various thicknesses.
Figure 5B:
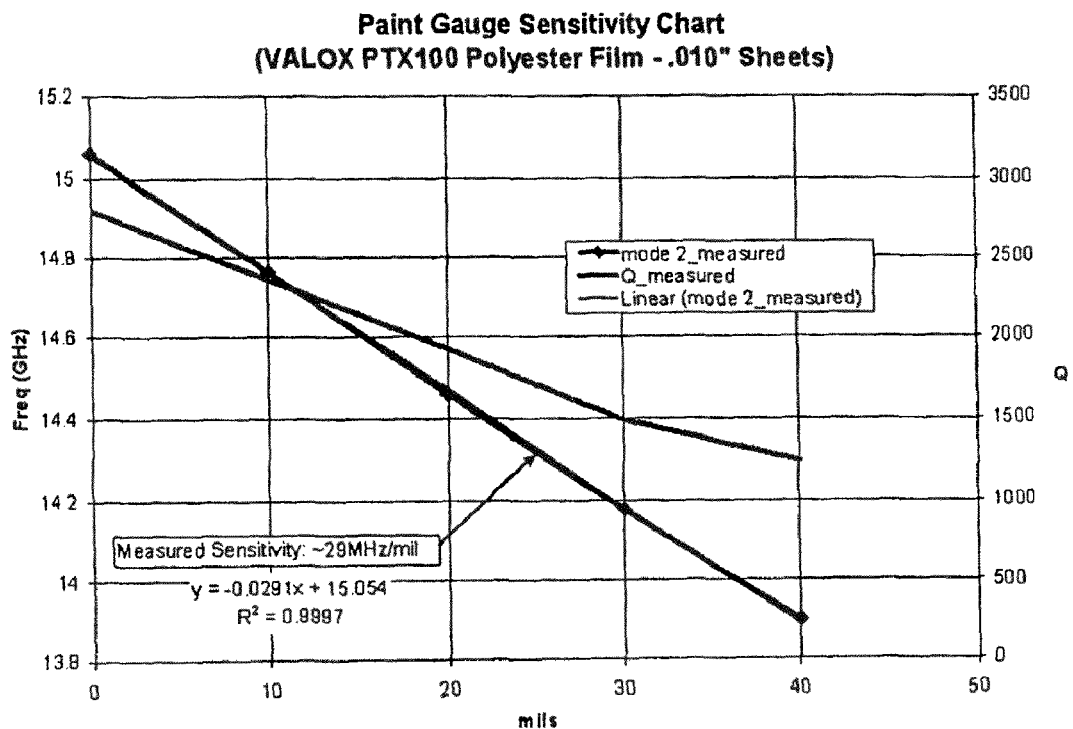
Figure 5C:
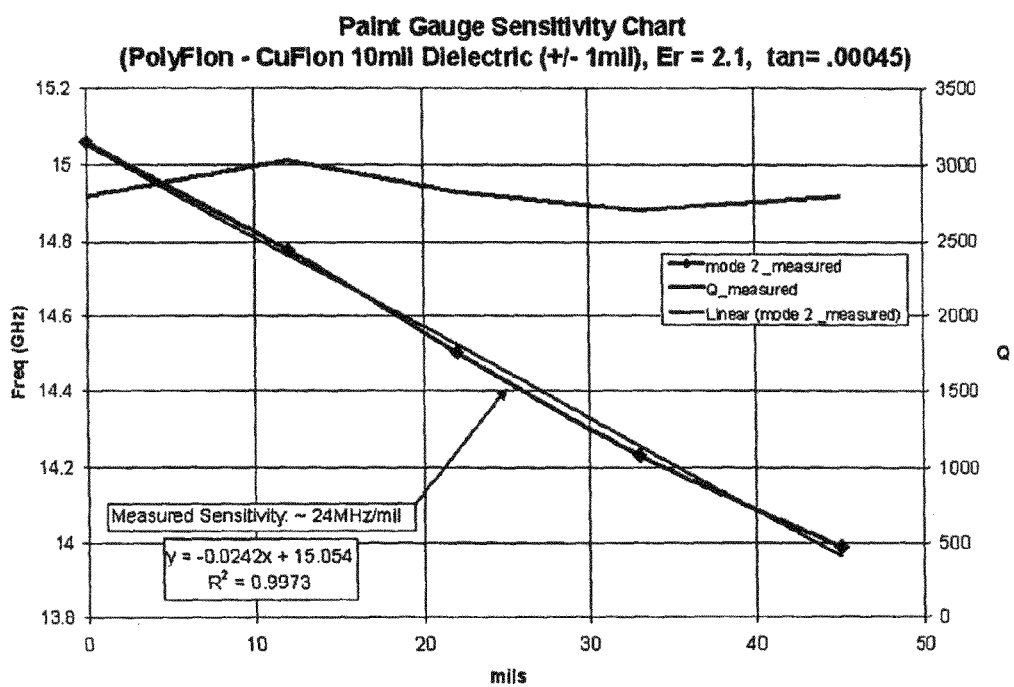

Initial tests were performed on three dielectric materials with known dielectric constants and thicknesses that ranged from 2 mils to 45 mils. An aluminum block was used as a backing surface for these tests. The measurement device used in this experiment used a TM011 cylindrical resonant cavity with a cavity height of 15 mm and a cavity radius of 10 mm. The results show that the resonant frequency was in the Ku-band range. The measurements showed a very linear relationship of resonant frequency to the thickness of the dielectric layer. Q was maintained above 1200. The plotted results are shown in FIGS. 5A, 5B, and 5C.

EXAMPLE 2

Further measurements using the measurement device of example 1 were performed on nine paint samples. The test samples were 2 feet by 2 feet graphite/epoxy panels with primer and topcoat applied. Two of the samples use BMS 10-118 primer and seven used the BMS 10-103 primer. The base coats were mica based for two panels with the seven others using BMS 10-72 topcoat. Eight of the panels have two decorative colors applied on top of the base coat. The ninth panel has one decorative color on the base coat.

The readings of panels labeled 1, B02, and Q01 were chosen for the calibration. These readings were paired with the results of the Paint Borer. MATLAB was used to generate the coefficients using a linear polynomial fit. The equation was applied to convert the frequency readings to mils.

Figure 6:
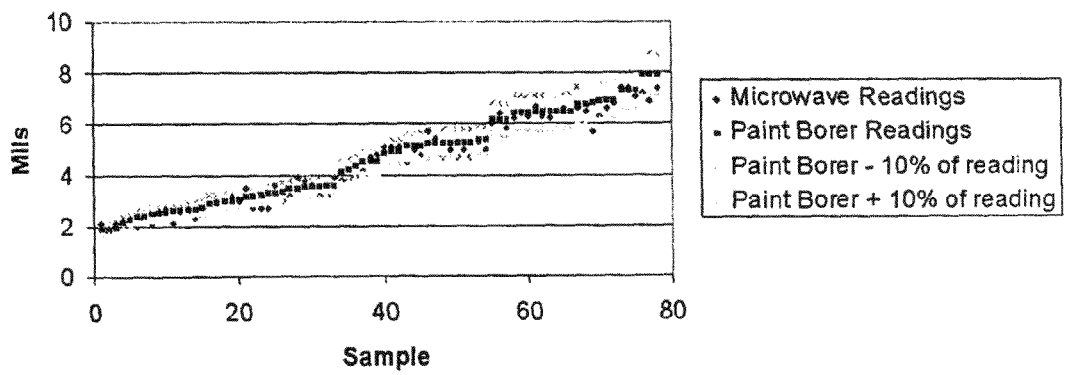
FIG. 6 is a chart showing the accuracy of measurements taken with a microwave paint thickness sensor in accordance with present disclosure compared to Paint Borer measurements.

FIG. 6 shows the raw data sorted by paint thickness measured by the Paint Borer. The Paint Borer is a precision drilling tool that drills a countersunk hole in a painted surface at a precise 45° angle and allows a measurement of the paint by looking at the drilled hole cross section under a microscope. By drilling at a 45° angle, the paint thickness is equal to the length of the paint layer in the drilled hole which can be easily measured. The graphic quickly shows how closely the microwave readings follow the Paint Borer measurement with very few points falling outside the +/−10% window. The average difference in the total thickness for the nine panels between readings taken with the Paint Borer and the improved cylindrical resonator is 5.2%. If a clean edge was available on a sample panel, it was also possible to view the edge of the paint using microscopy with a reticle for measurement. Measurements taken at the edge of the panels were compared with the Paint Borer interior measurement as a double check for calibration of the microwave sensor and calculation of the offset.

Readings taken on a panel with a different graphite/epoxy with a protective coating layer with one layer of primer showed an offset for the additional protective layer. A second panel with a nominal total coating thickness of 0.040 inch measured about 0.040 inch once the offset for the protective layer was subtracted from the reading.

The performance of the measurement device of 5.2% average difference is well within the expectation of a 10% difference from the Paint Borer readings. These examples show that the response is linear out to at least 40 mils.

It should be emphasized that the above-described embodiments of the present device and process are merely possible examples of implementations and merely set forth for a clear understanding of the principles of the disclosure. Many different embodiments of the microwave paint thickness sensor described herein may be designed and/or fabricated without departing from the spirit and scope of the invention. For instance, the physical outline is not unique, nor is the design frequency of resonance, nor are the elements to measure the change in resonant frequency due to the sample under test. For instance, the present disclosure could be used from multiple workstations in the manufacturing environment as a quality control measure. All these and other such modifications and variations are intended to be included herein within the scope of this disclosure and protected by the following claims. Therefore the scope of the disclosure is not intended to be limited except as indicated in the appended claims.

The invention claimed is:

1. A measurement device for measuring a thickness of a dielectric film layer on a surface of a substrate, comprising:
a right cylindrical resonant cavity operating in a TM011 mode, having an open side at a flat end of the resonant cavity, for placement in contact with the dielectric film layer to be measured whereupon the substrate acts as a wall of the resonant cavity, wherein a high frequency electromagnetic wave signal produces an electromagnetic field in the resonant cavity that is substantially normal to the substrate;
a microwave source to generate the high frequency electromagnetic wave signal coupled to the resonant cavity; and
a signal detector to sense a resonant frequency of the resonant cavity; and
a processor that correlates the resonant frequency of the resonant cavity to the thickness of the dielectric film layer.

2. The measurement device of claim 1, wherein the resonant cavity operates at optimal E- field mode normal to the surface being measured.

3. The measurement device of claim 1, wherein the dielectric film layer is a paint layer.

4. The measurement device of claim 1, wherein the substrate comprises a metallic material.

5. The measurement device of claim 1, wherein the substrate comprises a composite material.

6. The measurement device of claim 2, wherein the resonant cavity has a choke joint surrounding the open side of the resonant cavity.

7. The measurement device of claim 2, wherein the height of the resonant cavity is approximately one half of the length of a wavelength of the high frequency electromagnetic signal.

8. The measurement device of claim 2, wherein the diameter of the resonant cavity is approximately one half of the length of a wavelength of the high frequency electromagnetic signal.

9. The measurement device of claim 1, wherein the resonant cavity operates at optimal H-field mode.

10. The measurement device of claim 1, wherein the high frequency electromagnetic signal is in the microwave range.

11. A system for measuring a thickness of a dielectric material applied to a substrate, the system comprising:
a resonator including:
a resonant cavity operating in a TM011 mode and having an opening such that when the resonator is placed against the dielectric material to be measured, the resonant cavity is closed;
a choke groove disposed about the resonant cavity; and
an RF input and output disposed such that when an electromagnetic wave is transmitted through the input, the electromagnetic wave enters the resonant cavity and is able to pass through the output;
the resonator being configured such that when the electromagnetic wave enters the resonant cavity through the input, an electromagnetic field is produced incident upon the substrate that is substantially normal to the substrate; and
a processor that correlates the RF output of the resonant cavity to the thickness of the dielectric material.

12. The measurement system of claim 11, wherein the resonant cavity is a right cylindrical cavity with a height and radius approximately one-half of the length of a wavelength of the electromagnetic wave.

13. The measurement system of claim 12, wherein the height of the right cylindrical cavity is 15 millimeters, the radius of the right cylindrical cavity is 10 millimeters, and the electromagnetic wave is operating at 15 GHz.

14. The measurement system of claim 11, wherein the height of the resonant cavity is approximately one half of the length of a wavelength of the electromagnetic wave.

15. The measurement system of claim 11, wherein the diameter of the resonant cavity is approximately one half of the length of a wavelength of the electromagnetic wave.

16. The measurement system of claim 12, wherein the frequency of the electromagnetic wave is in the microwave range.

* * * * *